United States Patent [19]
Motomiya et al.

[11] Patent Number: 6,083,267
[45] Date of Patent: Jul. 4, 2000

[54] SYSTEM AND METHOD FOR DESIGNING ACCESSORY

[75] Inventors: Yukie Motomiya, Kokubunji; Yoh Miyamoto, Fuchu; Jun Furuya, Kokubunji, all of Japan

[73] Assignee: Hitachi, Ltd., Tokyo, Japan

[21] Appl. No.: 09/006,950

[22] Filed: Jan. 14, 1998

[30] Foreign Application Priority Data

Jan. 17, 1997 [JP] Japan .................................. 9-006930

[51] Int. Cl.⁷ .............................. G06F 7/48; G06F 17/60
[52] U.S. Cl. .................................. 703/6; 705/26; 705/27; 345/435
[58] Field of Search .................. 434/386, 307 R, 434/81, 371; 705/26, 27; 345/964, 435; 364/474.28; 706/919; 382/100; 395/500.27

[56] References Cited

U.S. PATENT DOCUMENTS

| | | | |
|---|---|---|---|
| 4,539,585 | 9/1985 | Spackova et al. | 382/100 |
| 5,440,479 | 8/1995 | Hutton | 705/26 |
| 5,444,836 | 8/1995 | Hollingsworth et al. | 345/435 |
| 5,495,568 | 2/1996 | Beavin | 395/161 |
| 5,515,268 | 5/1996 | Yoda | 705/26 |
| 5,724,522 | 3/1998 | Kagami et al. | 705/26 |
| 5,930,769 | 7/1999 | Rose | 705/27 |
| 5,974,400 | 10/1999 | Kagami et al. | 705/26 |
| 5,983,201 | 11/1999 | Fay | 705/27 |

OTHER PUBLICATIONS www.waw.com/ammonite/contents/soma.html; "Bracelet Marsailles" Page. May 1997.

Gregor, Anne. "Retailers Welcome the Influx of Craft Based Software Applications: Creativity Titles Let User Inagination Run Wild", Computer Retail Week, Oct. 6, 1997, pp. 47.

Brown, Lonnie. "Shape and Bake Jewelry", The Ledger of Lakeland, Florida, Oct. 27, 1997, retrieved from the internet at www.theledger.com/data/columns/dt102797.htm [retrieved Feb. 2, 2000].

Barbie Jewelry Designer, Users Manual, retrieved from the Internet at www.mattelmedia.com/barbie/jewelry designer/manual/09.html [retrieved Feb. 2, 2000].

*Primary Examiner*—Kevin J. Teska
*Assistant Examiner*—Douglas W. Sergent
*Attorney, Agent, or Firm*—Antonelli, Terry, Stout & Kraus, LLP

[57] ABSTRACT

A system and a method for designing an accessory are disclosed. Upon selection by a user of a commodity including an accessory such as a necklace, a pendant, a finger ring, an earring or a bracelet which he/she wants to design, a multiplicity of photographic images of various types of parts making up the particular accessory constituting the commodity are displayed in order to enable the user to design the accessory by himself/herself. The user repeats the simulation of selecting a preferred one of the multiplicity of parts of various types on display, moving the selected part to a specified area in the display screen and appropriately combining each part thus moved. The user thus decides to produce an accessory of his/her own originality to his/her liking.

14 Claims, 6 Drawing Sheets

SYSTEM AND METHOD FOR DESIGNING ACCESSORY

BACKGROUND OF THE INVENTION

The present invention relates to a system and a method for designing an accessory, or more in particular to a system and a method for designing an accessory suitably used for selling or purchasing an accessory such as jewelry through network shopping.

In recent years, demand has increased for a system in which the user can readily purchase an accessory such as jewelry of his/her own original design, which is different from ready-made accessories, by a simple ordering procedure. In the current practice of network shopping using the internet or the like, however, it is often the case that a multiplicity of (ready-made) commodities are offered for selection by the user ignoring his/her willingness to design.

Some ordinary shops handle commodities such as shirts and suits which can be custom-made. The procedure for ordering, however, is nothing other than the user selecting candidate items according to a predetermined sequence and finally placing an order for a selected item. There also exist shops which actually handle parts of accessories. In such shops, however, it is difficult for prospective customers to take time in selecting parts and arranging the selected parts as desired to check the state of a commodity which is expected to be completed.

Conventional systems for supporting the determination of design specifications are disclosed in JP-A-8-30674 and JP-A-8-134765. Also, a conventional system for preparing a menu for cooking is disclosed in JP-A-8-161293.

As described above, a conventional system is not available in which prospective purchasers can take time in designing original accessories such as jewelry to their preference before placing a purchase order. In the past, therefore, commodity purchasers had no choice but to select and purchase ready-made items in physical shops, by catalog shopping or network shopping.

SUMMARY OF THE INVENTION

The object of the present invention is to solve the above-mentioned problems encountered in the sale and purchase of accessories including jewelry and to provide a system and a method for designing accessories, in which prospective purchasers can take time in designing an original accessory including jewelry to their liking in the sale and purchase thereof by selecting parts, arranging the selected parts and by checking the completed state of the accessory without haste, thus enjoying the process of ordering.

According to one aspect of this invention for achieving the above-mentioned object, there is provided a system for designing an accessory on a display screen from the parts information supplied for various accessories, comprising means for displaying a plurality of types of parts required for designing an accessory, means for selecting an arbitrary one of the parts on display, means for arranging the selected part at the desired position, and means for displaying an arrangement of the selected parts.

According to another aspect of the invention for achieving the above-mentioned object, there is provided a system and a method for designing an accessory, wherein the parts include at least one of equipment, fasteners and beads, the means for displaying a plurality of types of parts displays each part by classification according the type thereof, the means for selecting the parts selects each part by type and is capable of selecting the material, the length and the color of the equipment, and the arranging means arranges the beads in lateral symmetry within the ring of the equipment.

According to still another aspect of the invention for achieving the above-mentioned object, there is provided a system and a method for designing an accessory, wherein the arranging means further includes means for arranging a new part in place of a part already selected and arranged when an attempt is made to arrange the new part in overlapped relation with the already-arranged part and means for rearranging the existing parts when a new part is arranged in place of another part already selected and arranged or when an arbitrary part is removed from the parts already selected and arranged.

According to a further aspect of the invention for achieving the above-mentioned object, there is provided a system and a method for designing an accessory, further comprising means for going through the procedure for purchasing an accessory through a public communication network, wherein information regarding the parts is supplied through a public communication network or from a storage medium.

According to a still further aspect of the invention for achieving the above-mentioned object, there is provided a system and a method for designing an accessory, further comprising the steps of executing each of the above-mentioned means.

DESCRIPTION OF THE PREFERRED EMBODIMENTS

Now, embodiments of a system and a method for designing an accessory according to the present invention will be described in detail with reference to the drawings.

Figure 1:
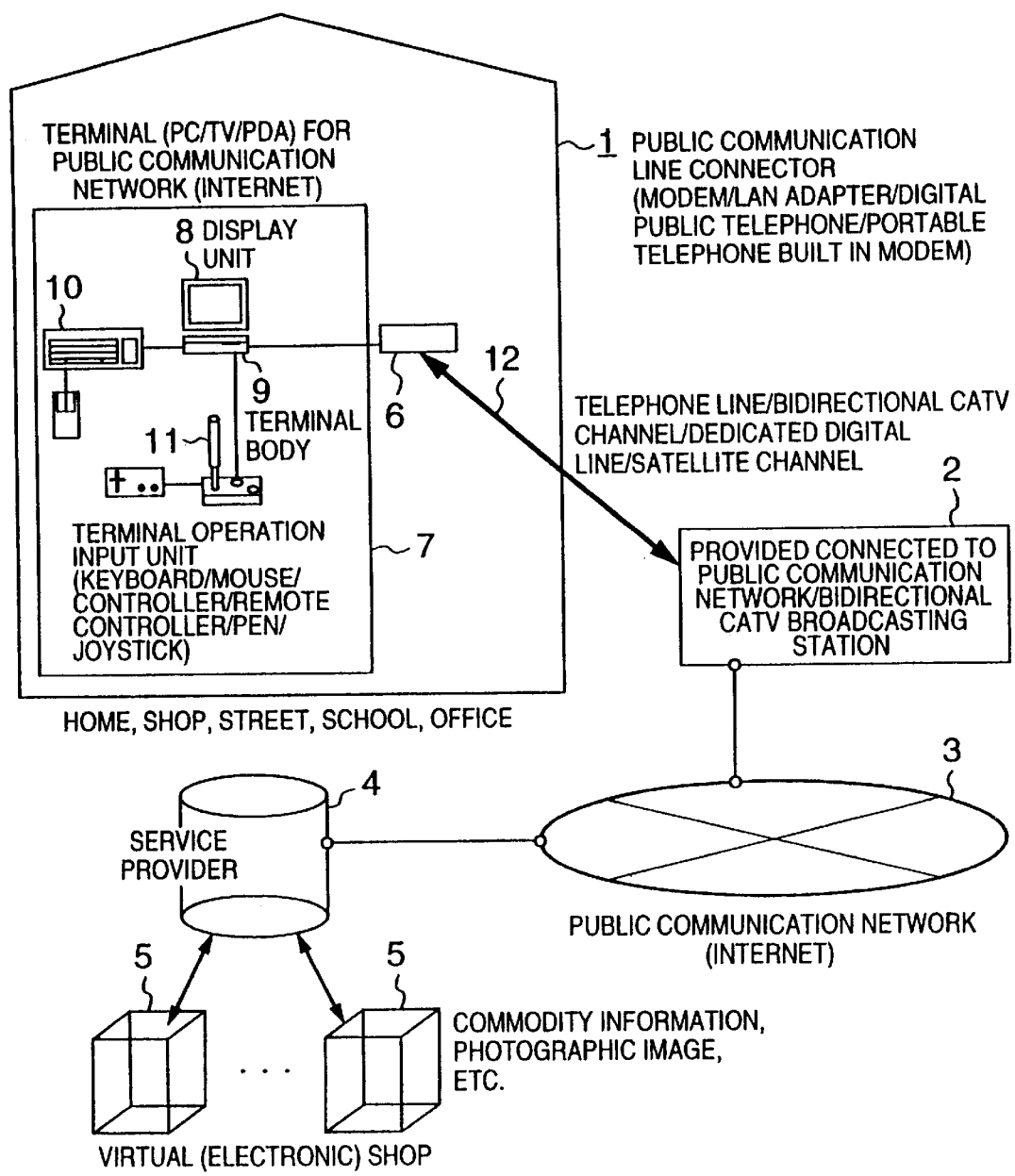
FIG. 1 is a block diagram showing a configuration of a network shopping system according to the present invention.
Figure 2:
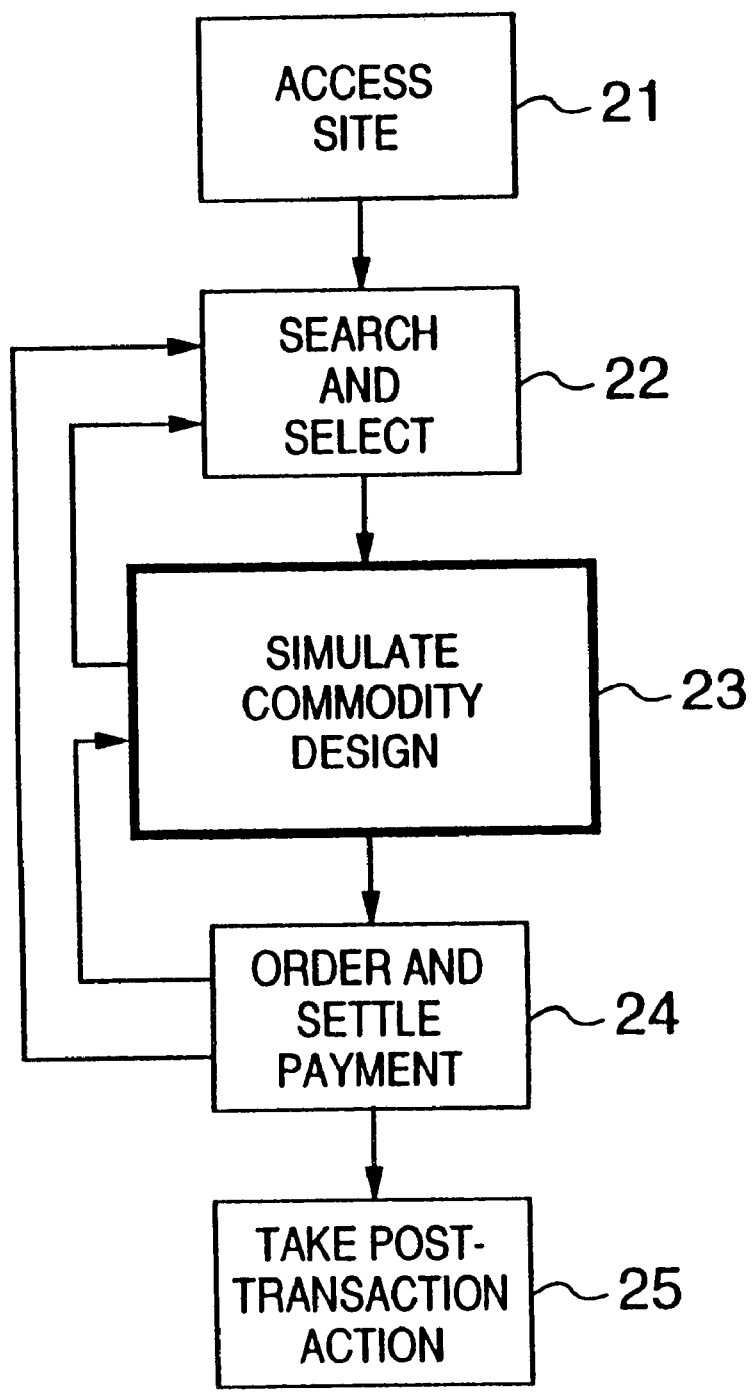
FIG. 2 is a flowchart for explaining the shopping procedure using the system shown in FIG. 1.

FIG. 1 is a block diagram showing a configuration of a network shopping system according to the invention, and FIG. 2 is a flowchart for explaining the shopping procedure using the system shown in FIG. 1. In FIG. 1, reference numeral 1 designates a user unit, numeral 2 an access unit, numeral 3 a public communication network, numeral 4 a service provider, numeral 5 virtual shops, numeral 6 a line connection unit, numeral 7 a user terminal, numeral 8 a display unit, numeral 9 a terminal body, numeral 10 an external memory unit, numeral 11 an input unit and numeral 12 a communication line.

The network shopping system according to the present invention shown in FIG. 1 comprises the public communication network 3 such as an internet, the access unit 2 connected to the public communication network, the purchaser (user) unit 1, the service provider 4, a plurality of virtual shops 5, and the communication line 12 such as the telephone line for connecting the access unit 2 and the purchaser unit 1. Although the purchaser unit 1, the access unit 2 and the service provider 4 are each shown as a single unit in FIG. 1, a multitude of these devices of course are actually connected to the public communication network 3. Also, in spite of the fact that only one public communication network 3 represented by the internet is shown in FIG. 1, a multitude of other networks may be interposed between the public communication network 3 and the purchaser unit 1.

The service provider 4 is associated with the virtual shops operated by commodity suppliers and provides the service of supplying the users with various commodity information available from the virtual shops 5. The access unit 2 provides the service of connecting the purchaser unit 1 constituting the user and the service provider 4 through the public communication network 3. The access unit 2 can thus be a provider for connection to the public communication network, a bidirectional CATV broadcasting station, etc. Also, the communication line 12 may be a telephone line, a bidirectional CATV channel, a satellite channel, etc.

The purchaser unit 1 includes a modem, a LAN adapter, a digital public telephone, a line connector 6 such as a portable telephone built in the modem, and a user terminal 7 such as a PC (personal computer), a TV, a PDA (portable terminal), etc. adapted for connection to the public communication network. The user terminal 7 includes a display unit 8, a terminal body 9, an external memory unit 10 and an input unit 11. The input unit 11, on the other hand, is configured of a keyboard, a mouse, a controller, a remote controller, a pen, a joystick, etc. or a combination thereof.

With the system configured as described above, the user desiring to do the network shopping or the window shopping on the network accesses the virtual shops 5 as a site through the line connector 6, the communication line 12, the access unit 2, the public communication network 3 and the service provider 4 from the user terminal 7. This access is processed in a similar manner to the access to the well-known internet.

The virtual shops 5 thus accessed transmit to the user terminal 7 information and the photographic images of various parts constituting the original accessories supplied by each of the particular shops. The user selects the parts displayed on the display unit 8 of his terminal and produces an accessory of his originality on the display screen.

Now, the procedure followed by the prospective customer desiring to do the network shopping on the system configured as described above will be explained with reference to the flowchart of FIG. 2.

(1) The prospective customer attempting to do the network shopping accesses the virtual shops 5 as a site through the line connector 6, the communication line 12, the access unit 2, the public communication network 3 and the service provider 4 from his terminal 7. The access is processed in a similar manner to the access to the well-known internet (step 21).

(2) The virtual shop 5 thus accessed transmits to the customer information, photographic images, etc. of the commodities such as necklaces, pendants, finger rings, earrings and bracelets which can be produced in various original forms and available in the shop. The prospective customer searches for and selects the commodity that he/she desires to purchase from the commodities displayed on his display unit 8 (step 22).

(3) Upon selection of a commodity, a multitude of photographic images of the various parts making up the accessory constituting the particular commodity to enable the customer to design it by himself/herself. The customer repeats the simulation of selecting and combining a multitude of parts of various types on display, and determines an original accessory to be produced to his/her liking (step 23).

(4) Once the design of the accessory constituting the commodity to be purchased is determined, the customer performs the procedure for ordering and paying. This procedure can be executed in a manner well-known for the network shopping. The customer can continue to repeat the simulation for designing another accessory (step 24).

(5) The physical shop supplying each of the virtual shops 5 follow the transaction processes by receiving an order from the customer and producing the accessory of the design ordered or sends the parts required for designing the ordered commodity (step 25).

The above-mentioned process of designing by simulation in step 23 is the feature of the present invention. A specific example of the simulation will be explained below as an embodiment of the invention.

Figure 3:
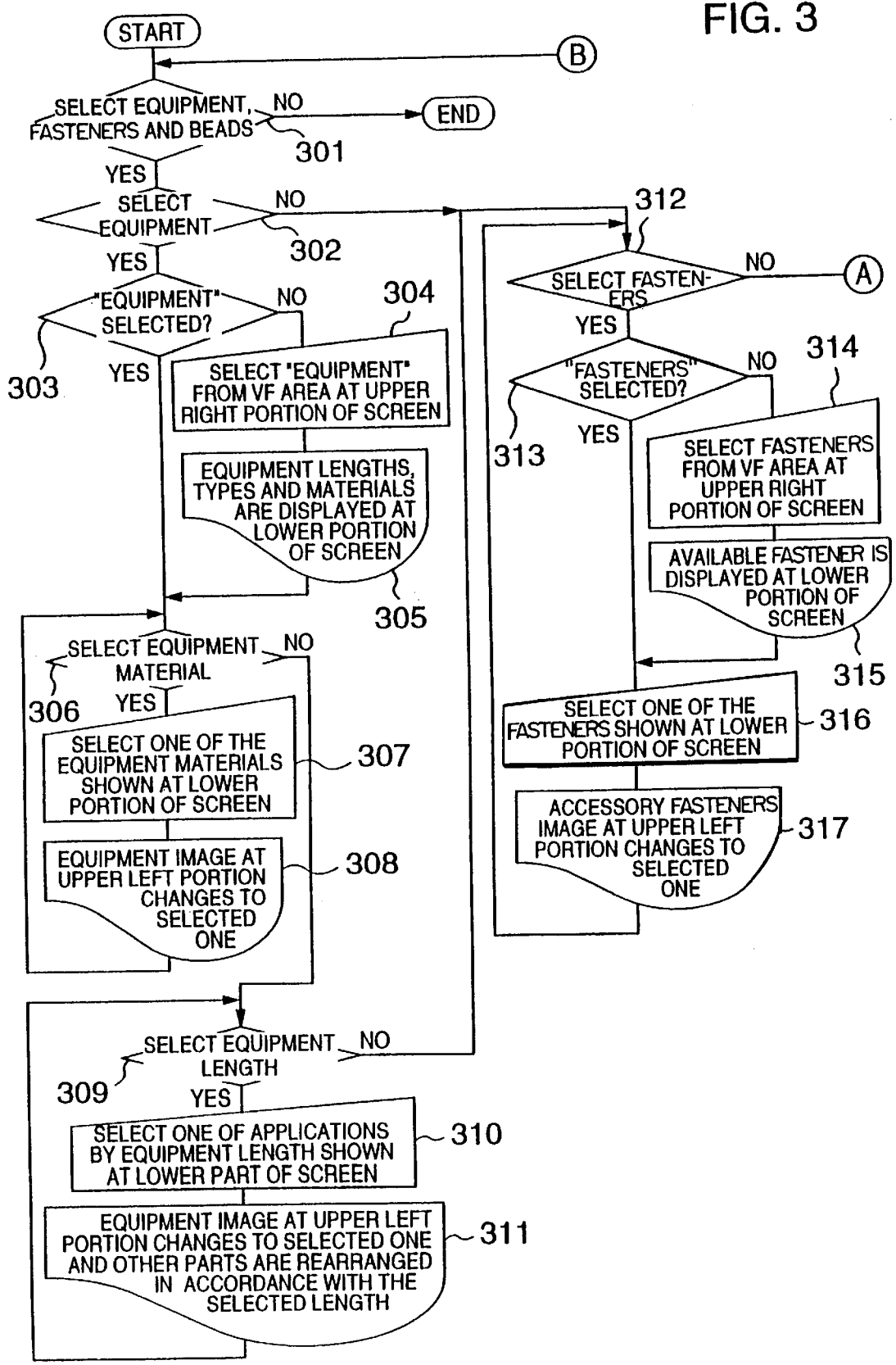
FIG. 3 is a flowchart (No. 1) for explaining a method of designing accessories using a simulation according to an embodiment of the invention.
Figure 4:
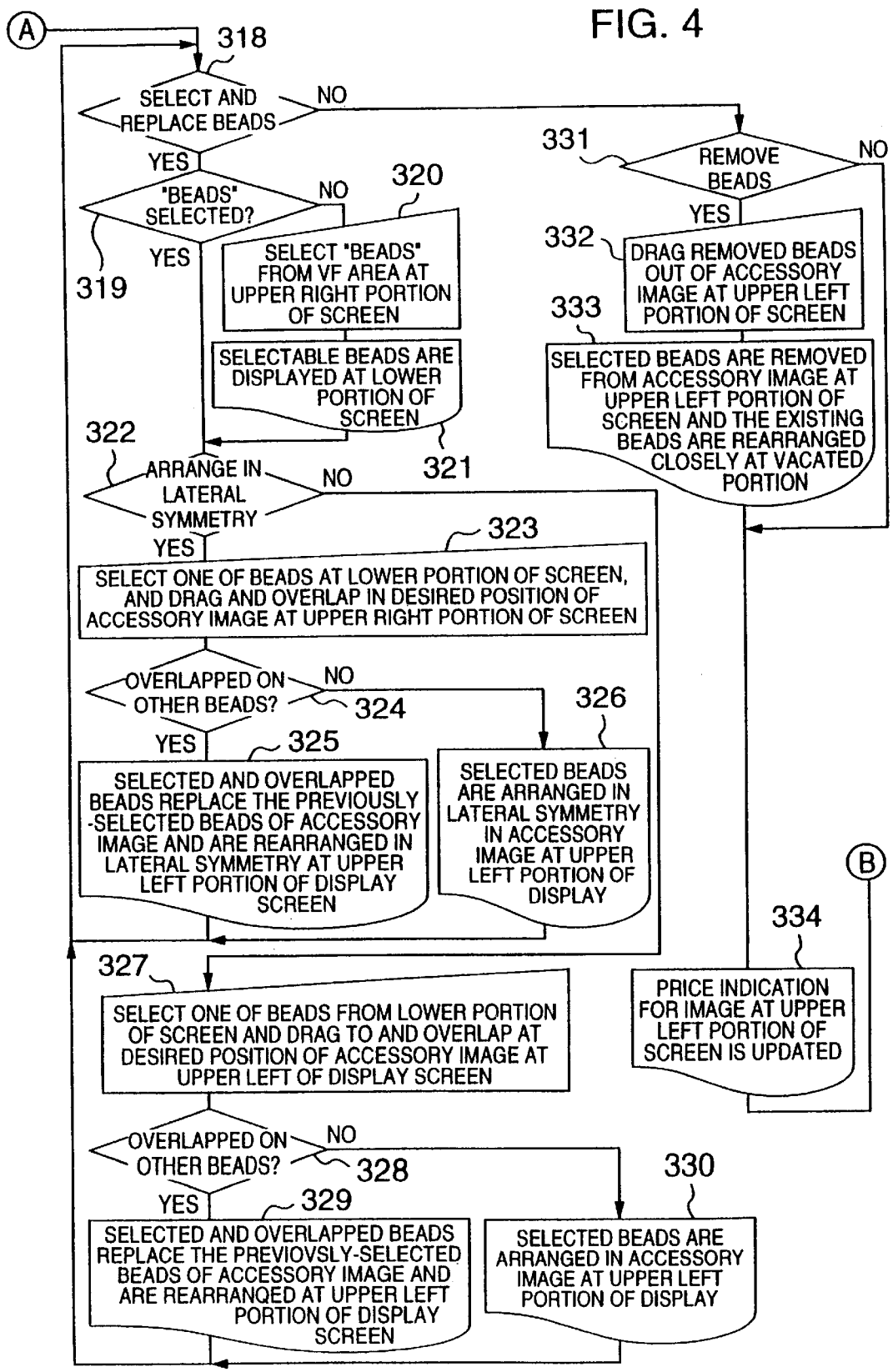
FIG. 4 is a flowchart (No. 2) for explaining a method of designing accessories using a simulation according to an embodiment of the invention.

FIGS. 3 and 4 are flowcharts for explaining a method of designing accessories using the simulation according to an embodiment of the invention, and FIGS. 5 and 6 are diagrams showing an example of the display screen for each step in FIGS. 3 and 4. This embodiment concerns the simulation in which a necklace or a bracelet is selected as an accessor and designed into a ring by arranging a multitude of beads having different shapes.

Figure 5A:
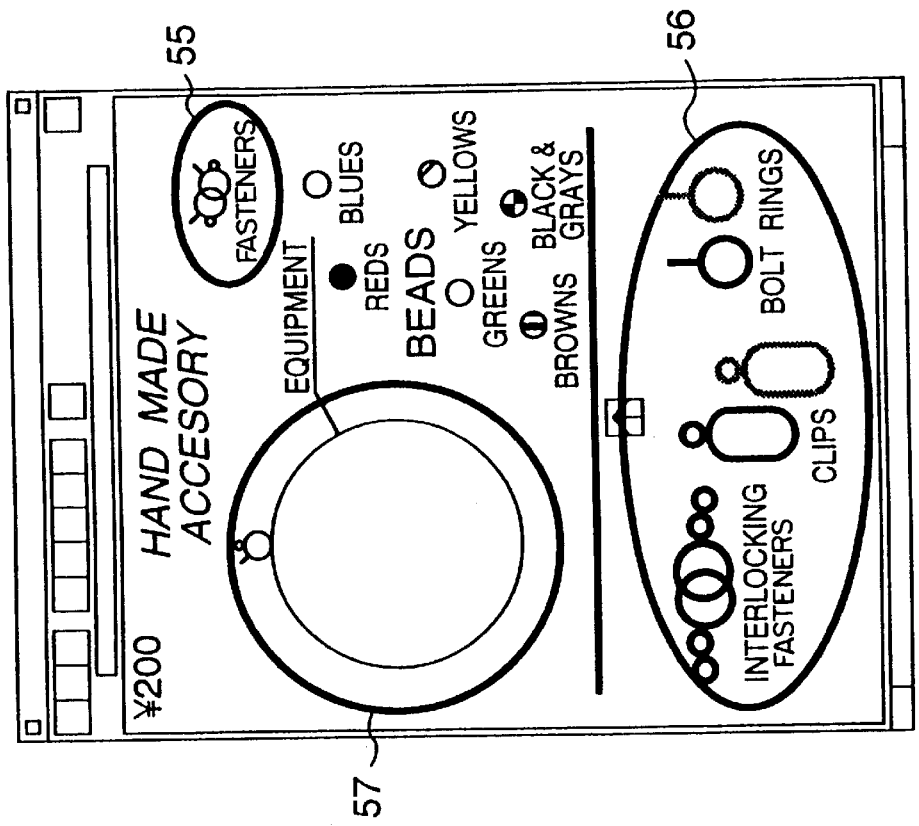
FIGS. 5A and 5B are diagrams showing an example of a display screen for each step of FIGS. 3 and 4, respectively.
Figure 5B:
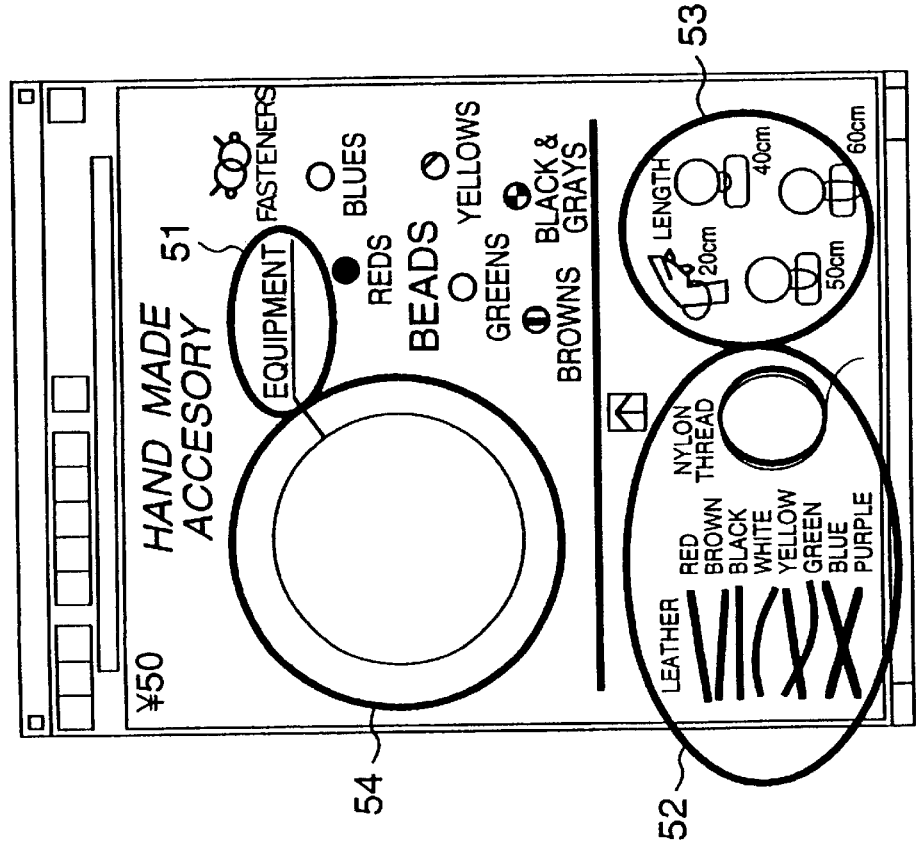

(1) A commodity to be designed is selected in step 22 as explained in FIG. 2, and the process proceeds to step 23. As shown in FIG. 5A, the initial display screen is for designing the selected accessory. In FIG. 5A, the material, the color and the length of the equipment, the color of the fasteners and the color of the beads are presented for selection as parts required for designing the necklace or the bracelet. In this example of the display screen, nothing may be displayed in the display area under the thick line drawn slightly below the screen center. Also, as a default state, the equipment of a nylon material having a standard length is displayed as a necklace, for example, in the equipment display area 54 at the upper right portion of the display screen. The customer starts design simulation with this state. When the customer watching the display screen desires to terminate the process, he/she can do so from an input unit or by selecting an END button not shown displayed on the display screen (step 301).

(2) Assume that the customer first attempts to select the equipment. When the customer wants to select the equipment other than the standard one displayed in the equipment display area 54, the customer selects the equipment button 51 on the display screen. As a result, the materials and colors of the equipment selectable are displayed in the area 52 at the lower portion of the display screen. At the same time, the selectable lengths of the equipment are displayed in the area 53 (steps 302 to 305).

(3) The customer desiring to select a material of the equipment selects one of the materials displayed in the area 52 together with a color thereof. Consequently, the image of the equipment displayed in the area 54 changes to the one selected. In the process, if the equipment already selected is on display in the area 54, the newly selected equipment is displayed in place of the equipment on display (steps 306 to 308).

(4) When desiring to select the length of the equipment, the customer selects one of the applications for each equipment length displayed in the area 53. As a result, the equipment image on display in the area 54 changes to the one of the selected length. When an undesired length of the equipment is displayed, the equipment length can be finely determined by the keyboard or the like. In such a case, the size of the area 54 may be required to be changed depending on the equipment length, in which case the parts on display other than the equipment are rearranged (steps 309 to 311).

(5) Suppose that the customer next attempts to select fasteners for connecting the equipment. When the customer wants to change the fasteners for the equipment already selected and displayed in the equipment display area 54 or when the fasteners are not yet selected, then the customer selects the fasteners button 55 on the display screen shown in FIG. 5B. As a result, various selectable shapes of the fasteners for fixing the equipment are displayed in the area 56 at the lower portion of the display screen (steps 312 to 315).

(6) The customer selects one of the fasteners displayed in the area 56. Consequently, as shown in the area 57 of FIG. 5B, the selected fasteners are displayed in the image of the equipment on display. Also in this case, even when the fasteners already selected are on display in the area 54, the newly selected fasteners are displayed in place of the fasteners already selected (steps 316, 317).

The aforementioned process completes the selection of the equipment and the fasteners. The steps starting with 302, 312 may be executed in reverse order. This is also the case with the steps starting with 306, 309.

(7) Next, the customer starts the process for arranging the beads in the equipment selected above. When the customer wants to select and arrange the beads on the equipment or wants to replace the beads while the beads button is not yet selected and various types of beads are not yet on display, then the customer selects the beads button 64 displayed on the right side of the center of the display screen as shown in FIG. 6A. Various shapes of beads available for use are displayed selectably in the area 62 at the lower portion of the display screen (steps 318 to 321).

(8) The customer decides whether the selected beads are arranged in lateral symmetry or not and registers the decision by means of a button or the like not shown (step 322).

(9) Assuming that the customer decides to arrange the selected buttons in lateral symmetry, the customer selects one of the colors of the beads arranged around the beads button 64 in the area 61, selects the desired beads shape from the area 62, and drags the selected beads by cursor to the position of the equipment on display in the area 63 where the customer wants to add the beads (the dragging is performed by designating the desired beads by cursor under the control of the mouse or the like and by moving the designated beads together with the cursor) (step 323).

(10) The process checks whether the previously-arranged beads are located at the position to which the new beads are dragged in step 323. When the new beads are overlapped on the previously-arranged beads in step 323, the beads previously selected and arranged are removed and the newly selected beads are arranged in place in lateral symmetry. This rearrangement is carried out by arranging the beads starting with the lowest portion of the equipment in accordance with the size and the hole position of all the beads thus far arranged, the length of the equipment and the type of the fasteners. At the same time, any beads that may have been displaced out of the equipment ring are removed and cease to be displayed on the accessory image (steps 324, 325).

(11) When the newly-selected beads are not overlapped on the previously-selected beads, on the other hand, the beads that have been newly dragged to the particular position are arranged in lateral symmetry (step 326).

(12) Assume that the customer has decided to arrange the selected beads are not in lateral symmetry, i.e., assume that customer has decided to arrange beads differently on the right and left sides in step 322. The customer selects a color from the area 61 in which various colors of the beads are arranged around the beads button 64, selects the beads of the desired shape from the area 62, and drags the beads to the position in the area 63 where the customer wants to add the beads to the equipment on display (step 327).

(13) The process checks whether the previously-arranged beads exist at the position to which the new beads are dragged in step 323. When the newly-selected beads are overlapped on the previously-selected beads in step 327, the beads previously selected and arranged are removed, and the new beads are rearranged at the same position. This rearrangement is performed in the same manner as in the aforementioned case. When the new beads are not overlapped on the previous beads, on the other hand, the newly-dragged beads are arranged at the particular position (steps 328 to 330).

(14) When the customer wants to remove the beads from the equipment ring, as shown within the area 63 of FIG. 6A, the beads which the customer wants to remove from the ring of the equipment having the particular beads are dragged and moved out of the accessory image. As a result, the selected beads are removed from the accessory image, and the remaining beads are rearranged closely at the position vacated by the removed beads (steps 331 to 333).

Figure 6B:
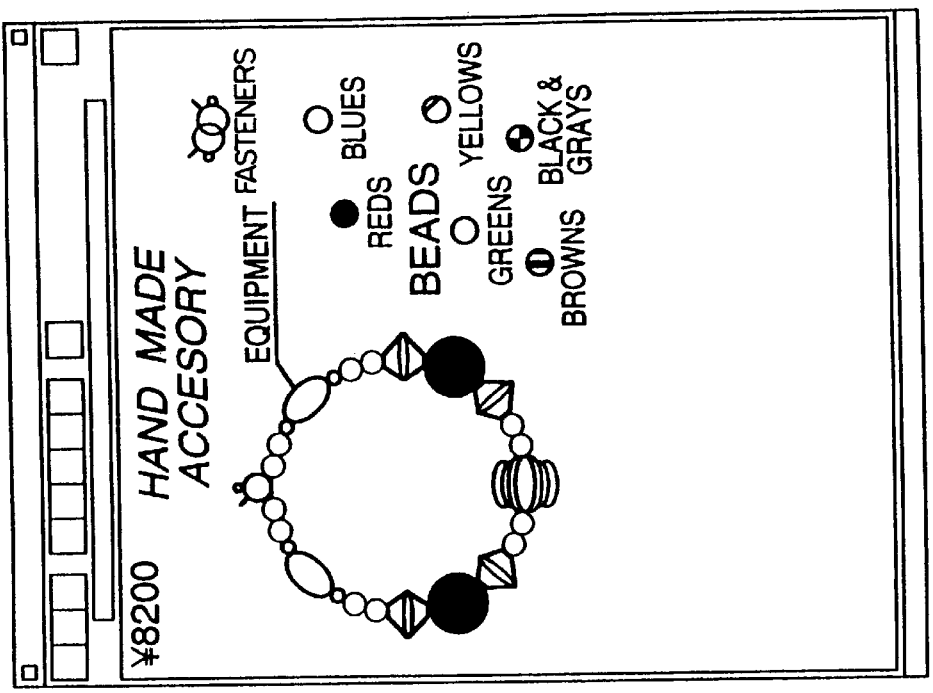
FIGS. 6A and 6B are diagrams showing an example of a display screen for each step of FIGS. 3 and 4, respectively.
Figure 6A:
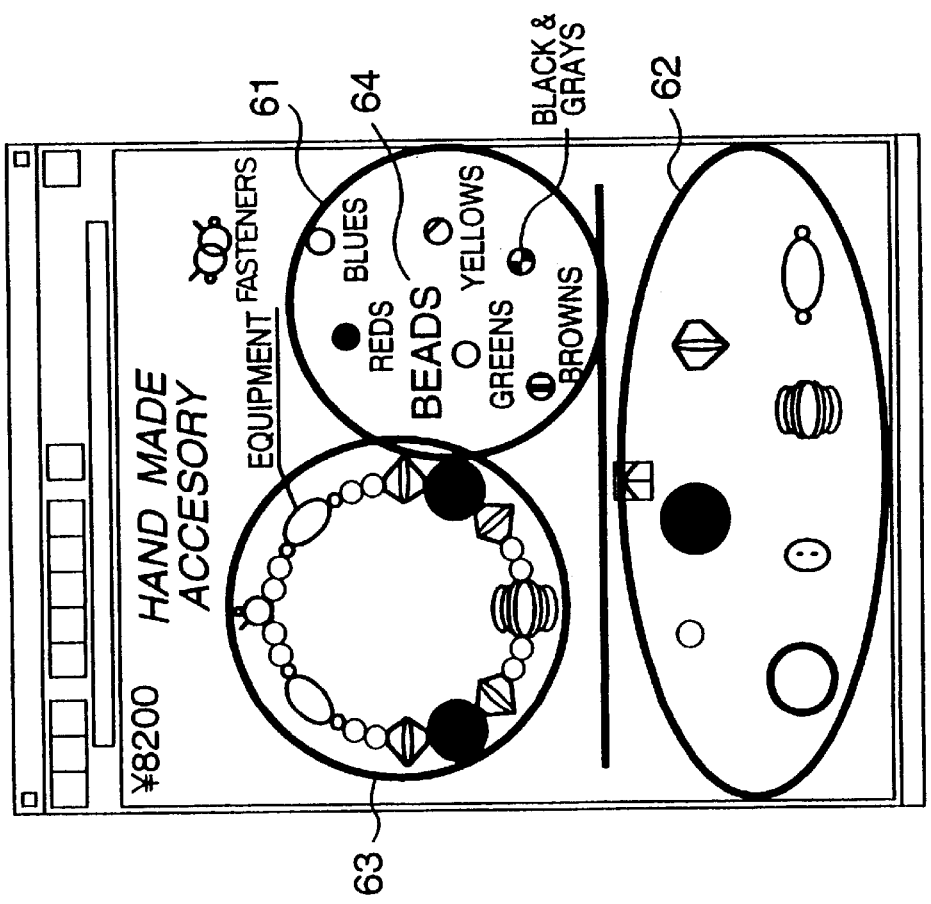

(15) The above-mentioned process is repeated to complete an accessory of an originality designed by the customer as shown in FIG. 6B. Also, each time a part constituting the accessory is selected in the steps described above, the prices of the parts are added sequentially and the sum is displayed at the upper left portion of the display screen. Upon completion of the accessory, the total price is displayed (step 334).

According to the above-mentioned embodiment of the invention, the customer desiring to purchase an accessory such as a jewelry item can design an original accessory meeting with his/her reference to his/her satisfaction. In the process, the customer can take time in selecting parts, arranging the parts thus selected, and checking the commodity as completed. The customer thus can enjoy the very process of designing an accessory.

An embodiment of the present invention is described above with reference to an example in which the accessory to be purchased is a necklace, a bracelet or the like. In spite of this, the present invention is equally applicable to other jewelry items.

Further, the present invention, which is explained above with reference to an embodiment applied to a network shopping system, can alternatively be configured in such a manner that the information required for designing an accessory as a commodity is supplied from a storage medium together with a program for executing the above-mentioned simulation and in such a manner that an operation similar to the above-mentioned operation can be performed using equipment such as a personal computer owned by the customer. Also, according to the present invention, a purchaser unit similar to the one included in the above-mentioned embodiments can be installed in a physical shop or the like and can be offered for use by customers desiring to design commodities on their own.

It will thus be understood from the foregoing description that according to the present invention, the customer can design an accessory of his/her originality meeting his/her sense, and for this purpose, can take time in selecting parts, arrange the selected parts and check the result of arrangement with his/her own eyes. In this way, the customer can purchase a highly unique commodity of his/her originality while enjoying the design process.

We claim:

1. A system for designing an accessory on a display screen from the information on parts for various accessories, comprising:

means for displaying a plurality of types of parts required for designing the accessory at a predetermined position in one display screen;

means for selecting an arbitrary part from among said parts displayed;

means for arranging said selected part at the desired position; and means for displaying the state in which said selected parts are arranged, wherein said means for displaying a plurality of types of parts required for designing the accessory comprises:

a base display area for displaying an image as a base for designing the accessory, a part display area for displaying the image of the parts, and a color select display area for selecting the color of the parts selected by at least one of said parts display areas;

wherein said means for selecting an arbitrary part from among said parts displayed is capable of the selection of arbitrary parts from said parts display area, and the selection of color of arbitrary parts from said color selection display area;

wherein further said means for arranging said selected part at the desired position is capable of arranging the parts selected in said parts display area at a desired position in said base display area; and wherein further still said means for displaying the state in which said selected parts are arranged displays the state in which the parts selected in said parts display area at a desired position in said base display area.

2. A system for designing an accessory according to claim 1, wherein said parts include at least one of equipment, fasteners and beads, wherein said means for displaying a plurality of types of parts displays the parts classified according to the types thereof at said parts display area, and wherein said parts-selecting means selects means selects said parts for each of said types.

3. A system for designing an accessory according to claim 2, wherein the material, the length and the color of said equipment can be selected.

4. A system for designing an accessory according to claim 2 or 3, wherein said beads are arranged in lateral symmetry within the ring of said equipment.

5. A system for designing an accessory according to any one of claims 1 to 3, wherein in the case where an attempt is made to arrange a new part at a position in overlapped relation with another part already selected and arranged at said position, said arranging means arranges said new part in place of said another part already selected and arranged.

6. A system for designing an accessory according to any one of claims 1 to 3, further comprising means for rearranging the existing parts in the case where a new part is arranged in place of another part already selected and arranged or in the case where any one of the parts already selected and arranged is removed.

7. A system for designing an accessory according to any one of claims 1 to 3, further comprising means for taking the procedure for purchasing said accessory through a public communication network.

8. A system for designing an accessory according to any one of claims 1 to 3, further comprising means for supplying information on said parts through a public communication network or from a storage medium.

9. In a system for designing an accessory on a display screen from information supplied thereto on various types of parts, a designing method comprising the steps of:

displaying types of parts required for designing the accessory at a predetermined position in one display image having a base display area for displaying an image as a base for designing the accessory, a part display area for displaying the image of the parts, a color select display area for selecting the color of the parts selected by at least one of said parts display areas;

selecting an arbitrary one of said parts displayed at said parts display area and the selection of color of the arbitrary parts from said parts display area;

arranging said parts selected in said parts display area at the desired position in said base display area; and displaying the state in which the parts selected in said parts display area are arranged at a desired position in said base display area.

10. A method for designing an accessory according to claim 9, wherein said parts include at least one of equipment, fasteners and beads, wherein said step of displaying a plurality of said parts in said display area displays said parts classified by type in said parts display area, and wherein said step of selecting said parts selects said parts by type.

11. A method for designing an accessory according to claim 9 or 10, wherein said step of arrangement arranges a new part in place of another part already selected and arranged in the case where an attempt is made to arrange said new part in overlapped relation with said another part already selected and arranged.

12. A method for designing an accessory according to claim 9 or 10, further comprising the step of rearranging the existing parts in the case where a new part is arranged in place of another part already selected and arranged or in the case where any one of the parts already selected and arranged is removed.

13. A method for designing an accessory according to claim 9 or 10, further comprising the step of taking the procedure for purchasing said accessory through a public communication network.

14. A method for designing an accessory according to claim 9 or 10, wherein the information on said parts is supplied through a public communication network or from a storage medium.

* * * * *